United States Patent
Cardillo

(10) Patent No.: US 12,209,723 B1
(45) Date of Patent: Jan. 28, 2025

(54) ACCENT LIGHTING ASSEMBLY FOR A UTILITY VEHICLE

(71) Applicant: Honda Motor Co., Ltd., Tokyo (JP)

(72) Inventor: Lindsey J. Cardillo, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 18/669,354

(22) Filed: May 20, 2024

(51) Int. Cl.
| | |
|---|---|
| *F21S 41/19* | (2018.01) |
| *B60Q 1/00* | (2006.01) |
| *F21S 41/125* | (2018.01) |
| *F21V 21/08* | (2006.01) |
| *F21V 21/088* | (2006.01) |
| *F21V 23/00* | (2015.01) |
| *F21V 23/04* | (2006.01) |
| *F21W 104/00* | (2018.01) |
| *F21W 107/10* | (2018.01) |

(52) U.S. Cl.
CPC ............ *F21S 41/19* (2018.01); *B60Q 1/0035* (2013.01); *F21V 21/0816* (2013.01); *F21V 21/088* (2013.01); *F21V 23/001* (2013.01); *F21V 23/008* (2013.01); *F21V 23/0435* (2013.01); *B60Q 2800/20* (2022.05); *F21S 41/125* (2018.01); *F21W 2104/00* (2018.01); *F21W 2107/10* (2018.01)

(58) Field of Classification Search
CPC .... F21S 41/19; B60Q 1/0035; F21V 21/0816; F21V 21/088; F21V 23/001; F21V 23/008; F21V 23/0435
See application file for complete search history.

(56) References Cited

U.S. PATENT DOCUMENTS

| | | |
|---|---|---|
| 1,443,290 A | 1/1923 | Strong |
| 3,947,677 A | 3/1976 | Steinle |
| 5,040,100 A | 8/1991 | Di Gaetano |
| 5,548,274 A | 8/1996 | Anderson et al. |
| 5,573,686 A | 11/1996 | Lavicska |
| 6,817,743 B2 | 11/2004 | Sharper |
| 6,866,406 B1 | 3/2005 | Starkey et al. |
| 7,220,031 B1 | 5/2007 | Lowman et al. |
| 7,229,197 B2 * | 6/2007 | Tanaka ............... B60R 1/1207 362/465 |
| 9,242,596 B2 | 1/2016 | Thomson |

(Continued)

FOREIGN PATENT DOCUMENTS

| | | |
|---|---|---|
| DE | 824309 C | 12/1951 |
| DE | 102018202558 A1 | 8/2018 |

(Continued)

*Primary Examiner* — Bryon T Gyllstrom
(74) *Attorney, Agent, or Firm* — Joshua Freier; American Honda Motor Co., Inc.

(57) ABSTRACT

A utility vehicle with a side-by-side seating arrangement that includes an accent lighting assembly having a forward mounted accent light assembly, a front left wheel well accent light and front right wheel well accent light assembly, and a rear left wheel well and rear right wheel well accent light assembly. The accent lighting assembly includes a bracket member for attaching the accent lights and securing to the utility vehicle. A controller in communication with the accent lights is mounted under a hood of the utility vehicle. The accent lighting assembly allows a secure attachment to a utility vehicle that may travel over rough terrain.

19 Claims, 9 Drawing Sheets

(56) References Cited

U.S. PATENT DOCUMENTS

| | | | | |
|---|---|---|---|---|
| 9,963,001 | B2* | 5/2018 | Salter | B60C 23/0406 |
| 10,028,355 | B1* | 7/2018 | Hancock | G01R 22/063 |
| 10,730,430 | B2* | 8/2020 | Williams | F21S 43/27 |
| 2007/0057807 | A1* | 3/2007 | Walters | H05B 47/22 |
| | | | | 340/7.29 |
| 2007/0206389 | A1* | 9/2007 | Salazar | B60Q 1/2692 |
| | | | | 362/540 |
| 2008/0298079 | A1 | 12/2008 | Whitehead | |
| 2009/0213605 | A1 | 8/2009 | Wilkerson, III | |
| 2012/0113642 | A1* | 5/2012 | Catalano | F21V 23/00 |
| | | | | 362/249.02 |
| 2017/0023723 | A1* | 1/2017 | Tanaka | F21S 43/27 |
| 2020/0108877 | A1* | 4/2020 | Prabhakar | B60Q 1/0035 |
| 2021/0102679 | A1* | 4/2021 | Potter | B60Q 1/05 |

FOREIGN PATENT DOCUMENTS

| | | | |
|---|---|---|---|
| JP | 2004216921 A | 8/2004 | |
| JP | 3891276 B2 | 3/2007 | |

\* cited by examiner

ACCENT LIGHTING ASSEMBLY FOR A UTILITY VEHICLE

BACKGROUND

The present disclosure relates generally to vehicle accessories and lighting. More specifically, to systems and methods of mounting an accent lighting system to an underside of a utility vehicle.

There are known vehicles, typically utility, off-road, or all-terrain utility vehicles that include accent lighting systems installed thereon by a dealer or installed aftermarket by a customer. The installation process may be time-consuming, laborious, irreversible, and could damage the wiring if done incorrectly. Additionally, accent lighting for off-road or all-terrain utility vehicles should be securely mounted to reduce vibration and prevent movement when traveling over rough terrain. Therefore, there is a need for an improved method of mounting accent lighting that allows for consistent and secure attachment to utility, off-road, or all-terrain utility vehicles.

SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

In one aspect, a utility vehicle with a side-by-side seating arrangement is provided. The utility vehicle includes an accent lighting assembly including a forward mounted accent light assembly, a front left wheel well and front right wheel well accent light assembly, and a rear left wheel well and rear right wheel well accent light assembly. The accent lighting assembly includes a bracket member having accent light mounting holes, bracket mounting holes for attachment to the utility vehicle, and an opening for routing a wire harness. The accent lighting assembly includes a controller in communication with the accent lights mounted to a support bracket of the utility vehicle.

In another aspect, a utility vehicle with an engine at least partially encompassing an area rearward of a vehicle seat, a cargo bed extending rearward of the vehicle seat and a radiator at least partially encompassing an area forward of the vehicle seat includes an accent lighting assembly with accent lights mounted in at least four positions on an underside of the utility vehicle. A bracket member is coupled to each accent light assembly with fasteners. The bracket members include bracket mounting holes for attachment to the utility vehicle, wherein the bracket members include formed portions aligning with contours of the utility vehicle.

In yet another aspect, a method of mounting an accent lighting system to a utility vehicle including a side-by-side seating arrangement and a cargo bed extending rearward of the vehicle seat. The method comprising mounting at least four bracket members to the underside of the utility vehicle, each bracket member includes bracket mounting holes for attachment to the utility vehicle. The method also includes mounting a controller of the accent lighting system under a hood of the utility vehicle. Finally, routing a wire harness of an accent light through an opening in each bracket and attaching the accent lights to the accent light mounting holes of each bracket.

DETAILED DESCRIPTION

Figure 1A:
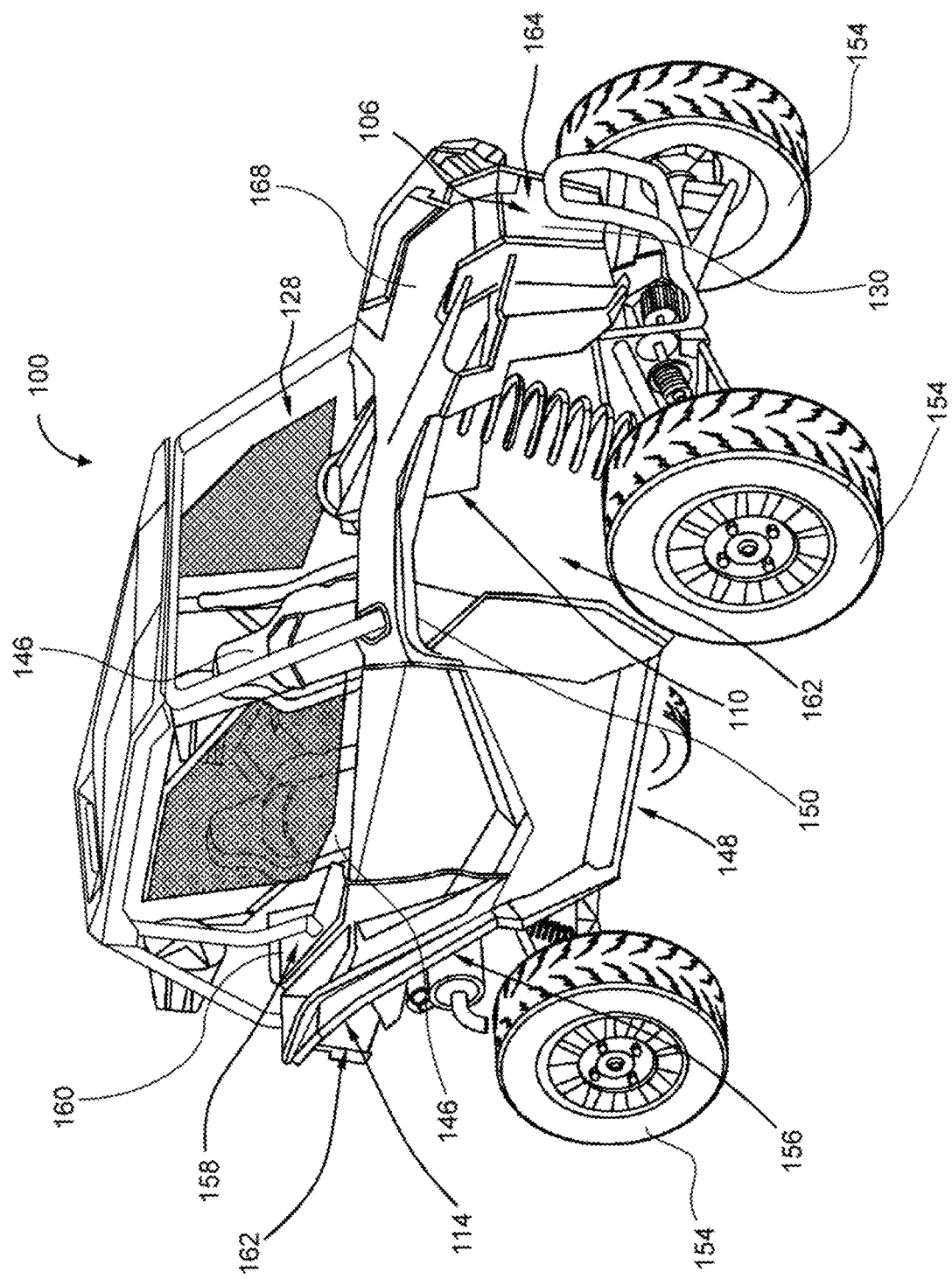
FIG. 1A is a right-side perspective view of an exemplary utility vehicle.

The embodiments described herein relate generally to systems and methods of mounting an accent lighting assembly 102 to a utility vehicle 100. More specifically, the accent lighting assembly 102 described herein is designed for illuminating an underside 148 of the utility vehicle 100. The accent lighting assembly 102 includes accent lights 104 mounted to bracket members 116. The accent lights 104 may include a variety of shapes and configurations, such as angled surfaces (not shown) with multiple bulbs, light-emitting-diodes or other lighting sources in various locations, or surfaces of the accent light 104. For example, the accent light 104 may include two or more angled surfaces with lighting on each angled surface to provide illumination for the underside 148 of the utility vehicle 100.

The bracket members 116 may be formed to accommodate installation in multiple locations on the utility vehicle 100. Bracket members 116 may be formed from a variety of manufacturing methods, such as stamping, injection molding, thermoforming, casting, or other means capable of producing the desired shape. As such, the accent lighting assembly 102 is mountable to the utility vehicle 100 in a secure and user-friendly manner.

FIG. 1A is a right-side perspective view of an exemplary utility vehicle 100. In the exemplary embodiment, the utility vehicle 100 includes a cabin 128 with vehicle seats 146 arranged in a side-by-side seating arrangement inside the cabin 128. A cargo bed 160 and an engine 156 are encompassing an area rearward 158 of the vehicle seats 146. The utility vehicle 100 includes wheel wells 162 over the tire, wheel, suspension, and other chassis components. FIG. 1A shows the general mounting location of a forward mounted accent light assembly 106, a front right wheel well accent light assembly 110, and a rear right wheel well accent light assembly 114.

Figure 1B:
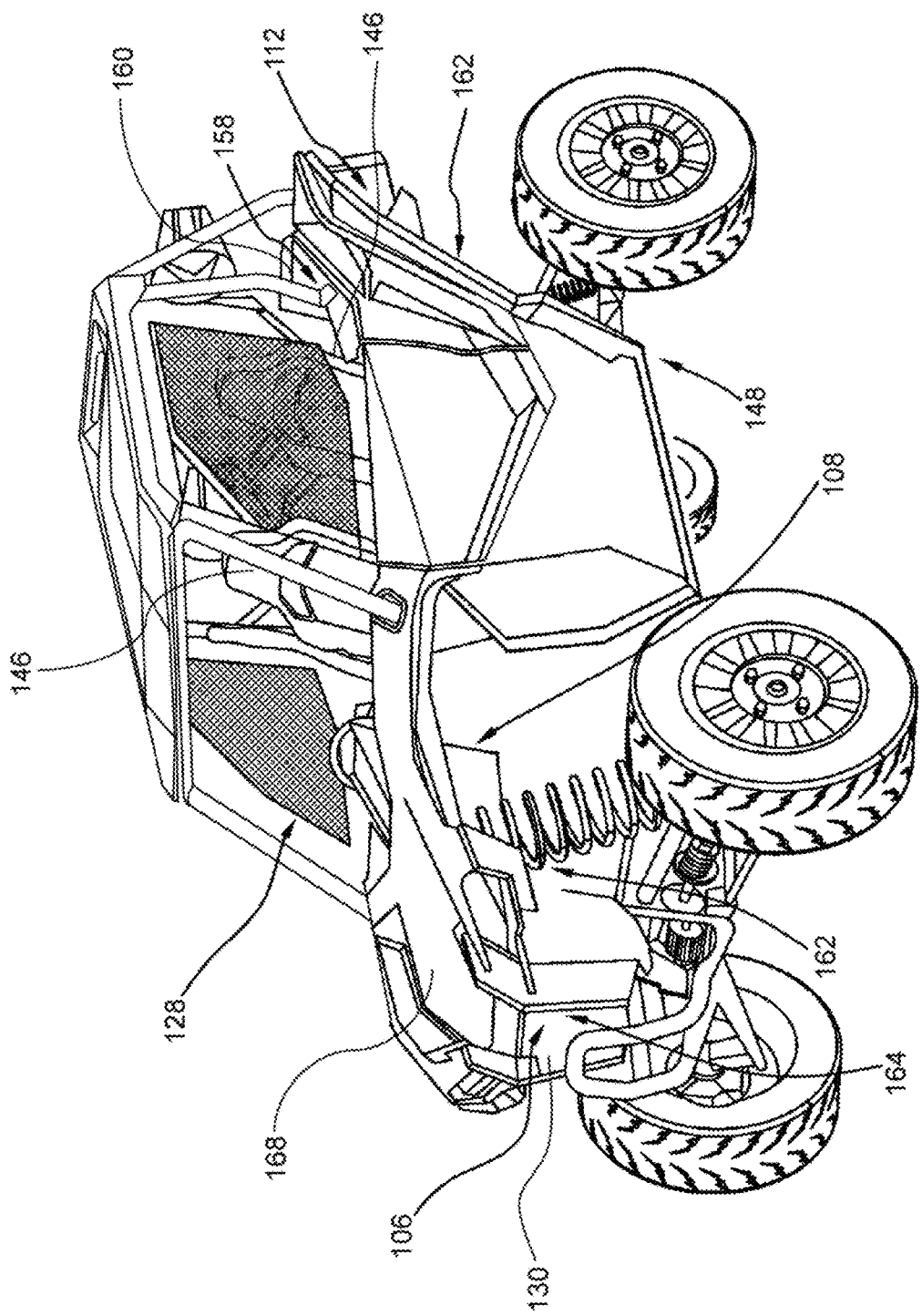
FIG. 1B is a left-side perspective view of the exemplary utility vehicle.

FIG. 1B is a right-side perspective view of an exemplary utility vehicle 100. In the exemplary embodiment, the utility vehicle 100 includes the cabin 128 with vehicle seats 146 arranged in a side-by-side seating arrangement inside the cabin 128. A cargo bed 160 and an engine 156 are encompassing an area rearward 158 of the vehicle seats 146. The utility vehicle 100 includes wheel wells 162 over the tire, wheel, suspension, and other chassis components. FIG. 1B shows the general mounting location of the forward mounted accent light assembly 106, the front left wheel well accent light assembly 108, and the rear right wheel well accent light 112. FIGS. 1A and 1B each depict a hood 168 forward of the vehicle cabin 128 to cover the front of the utility vehicle 100.

Figure 2:
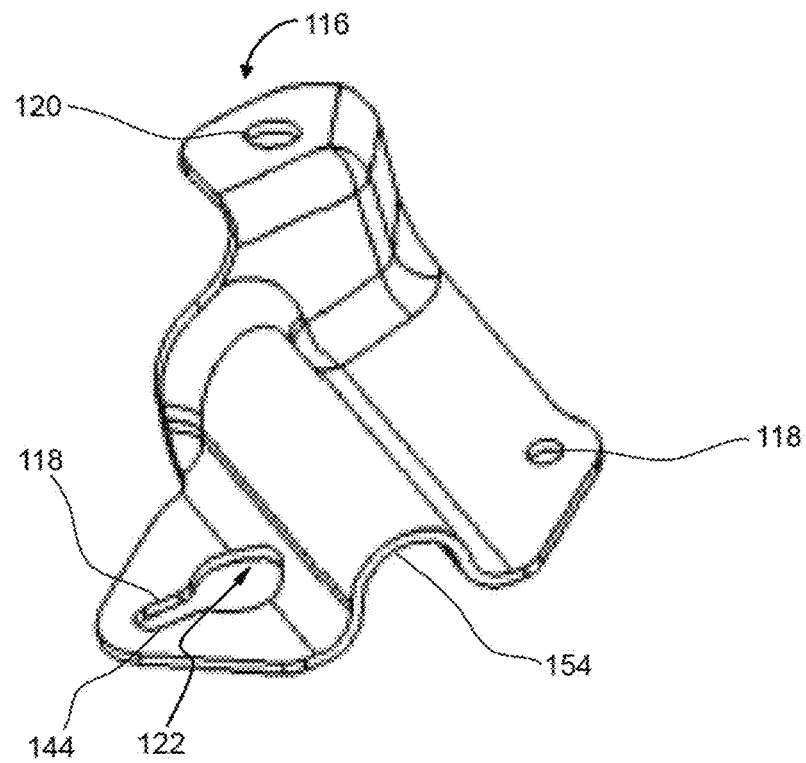
FIG. 2 is a perspective view of a bracket member used for mounting a front left wheel well accent light assembly of an accent lighting assembly.
Figure 4:
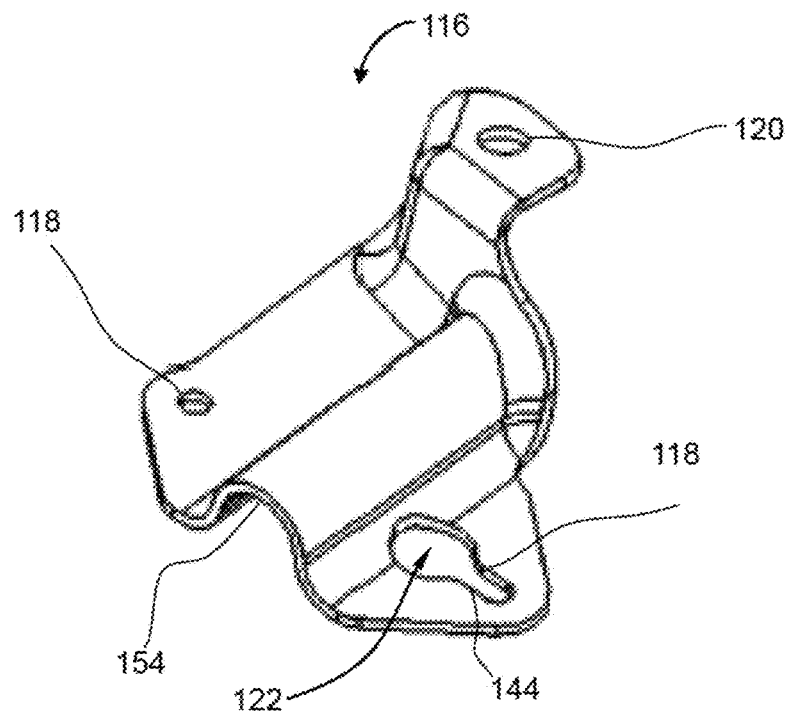
FIG. 4 is a perspective view of the bracket member used for mounting a front right wheel well accent light assembly of the accent lighting assembly.

FIG. 2 and FIG. 4 illustrate the bracket member 116 for securing accent light 104 and bracket member 116 of the accent lighting assembly 102 to the utility vehicle 100. The bracket member 116 shown in FIG. 2 and FIG. 4 includes accent light mounting holes 118 and bracket mounting holes 120. The accent light mounting holes 118 may include an opening 122 with a slotted portion 144. The opening 122 should be large enough to allow a wire harness 124 (see FIG. 12) for an accent lighting system 102 to pass through. Specifically, the opening 122 is large enough for a coupler 152 of the wire harness 124 to pass through (see FIG. 12). Also, the bracket member 116 may include a formed portion 154, as shown in FIG. 2 and FIG. 4.

The slotted portion 144 to allows for some variability when mounting the accent light 106 to the bracket member 116. The slotted portion 144 may extend in a rectangular shape from the opening 122 to create a shape of a semi-circle with a rectangle extending having a width smaller than the diameter of the opening 122, as shown in FIG. 2 and FIG. 4. The width of the slotted portion 144 may be sized according to fasteners 134 used to secure the accent light 104 and the bracket member 116.

Figure 3:
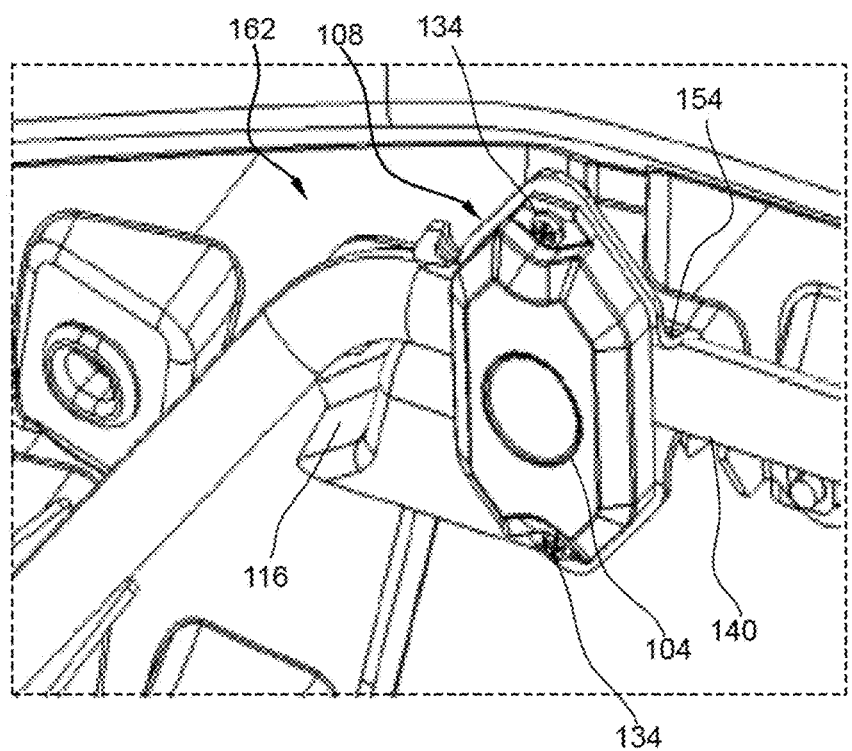
FIG. 3 is a perspective of the bracket member of FIG. 2. with the front left wheel well accent light assembly installed and mounted to the utility vehicle.

FIG. 3 is a perspective view of the bracket member 116 of FIG. 2. with a front left wheel well accent light assembly 108 installed and mounted to the wheel well 162 the utility vehicle 100. The front left wheel well accent light assembly 108 includes accent light 104 attached to the bracket member 116 with fasteners 134. The fasteners 134 may be screws, as shown in FIG. 3; however, it will be appreciated that other fasteners common in the art may be used, such as push-pins or bolts. The fasteners 134 used to attach the accent light 104 may also extend to the utility vehicle 100 to secure the bracket member 116 to the utility vehicle 100.

The bracket member 116 of FIG. 3 shows the formed portion 154 contouring around a frame member 140 of the utility vehicle 100. The frame member 140 is shown to be round or tubular in FIG. 3; however, it is envisioned that the frame member 140 could have other shapes or contours in which the formed portion could contour around. The bracket mounting hole 120 of FIG. 2 is also secured to the utility with fastener 134, but it is not visible in the perspective view of FIG. 3 because of the frame member 140. The formed portion 154 may include ribs (not shown) to provide added structure or reinforcement for the bracket mounting holes 120.

Figure 5:
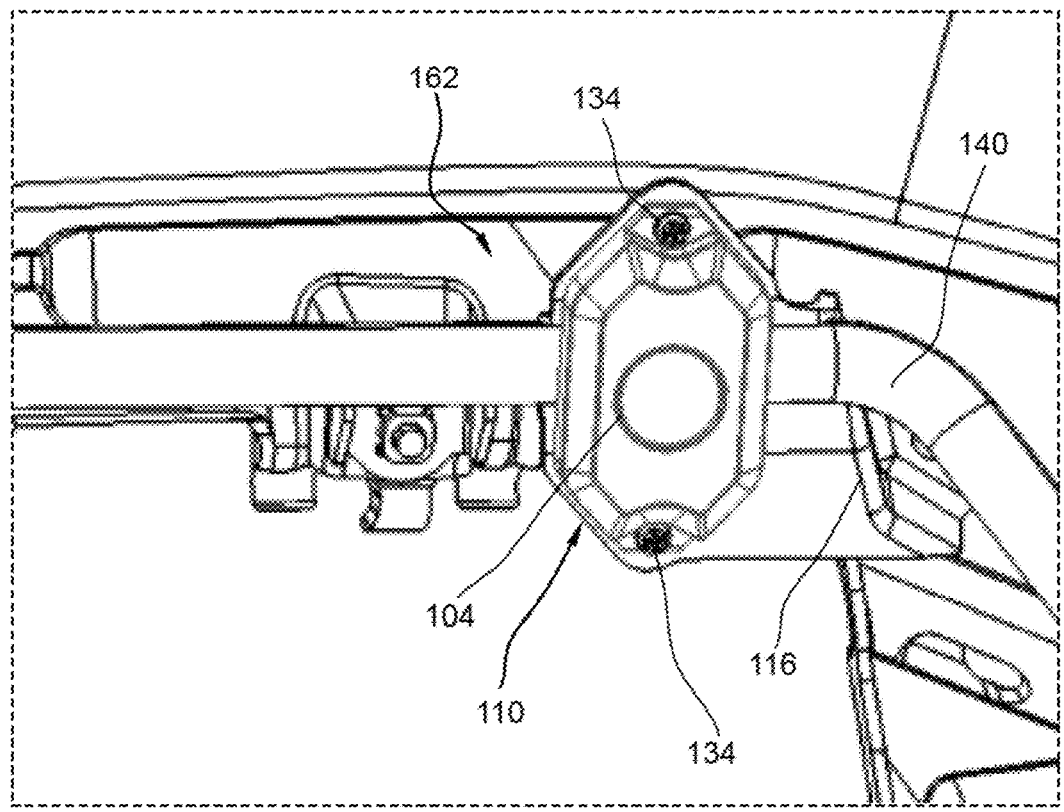
FIG. 5 is a perspective of the bracket member of FIG. 4. with the front right wheel well accent light assembly installed and mounted to the utility vehicle.

FIG. 5 is a perspective view of the bracket member 116 of FIG. 4. with a front right wheel well accent light assembly 110 installed and mounted to the wheel well 162 the utility vehicle 100. Similar to FIG. 3, the front right wheel well accent light assembly 110 includes accent light 104 attached to the bracket member 116 with fasteners 134. The fasteners 134 may be screws, as shown in FIG. 5; however, it will be appreciated that other fasteners common in the art may be used, such as push-pins or bolts. The fasteners 134 used to attach the accent light 104 may also extend to the utility vehicle 100 to secure the bracket member 116 to the utility vehicle 100.

The bracket member 116 of FIG. 5 shows the formed portion 154 contouring around the frame member 140 of the utility vehicle 100. The frame member 140 is shown to be round or tubular in FIG. 3; however, it is envisioned that the frame member 140 could have other shapes or contours in which the formed portion 154 could contour around. The bracket mounting holes 120 of FIG. 4, is also secured to the utility with fasteners 134, but it is not visible in the perspective view of FIG. 5 because of the frame member 140. The formed portion 154 may include ribs (not shown) to provide added structure or reinforcement for the bracket mounting holes 120.

Figure 6:
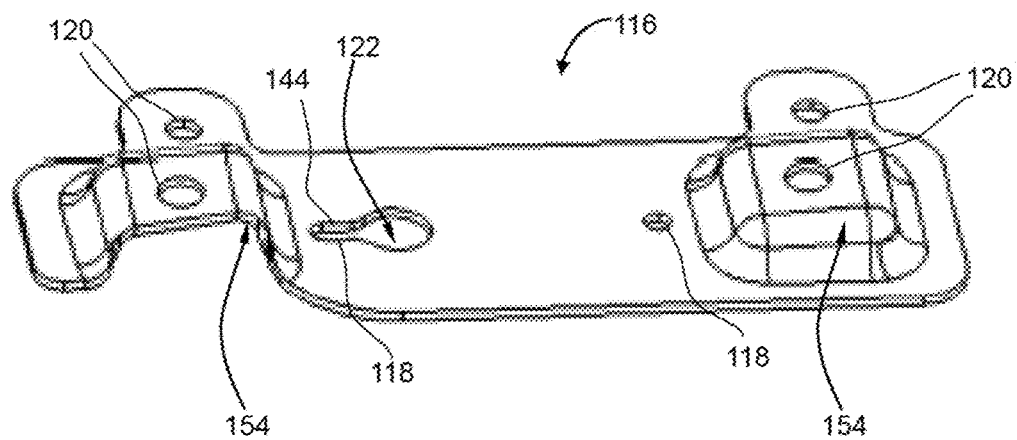
FIG. 6 is a perspective view of the bracket member used for mounting a rear left wheel well accent light assembly of the accent lighting assembly.
Figure 8:
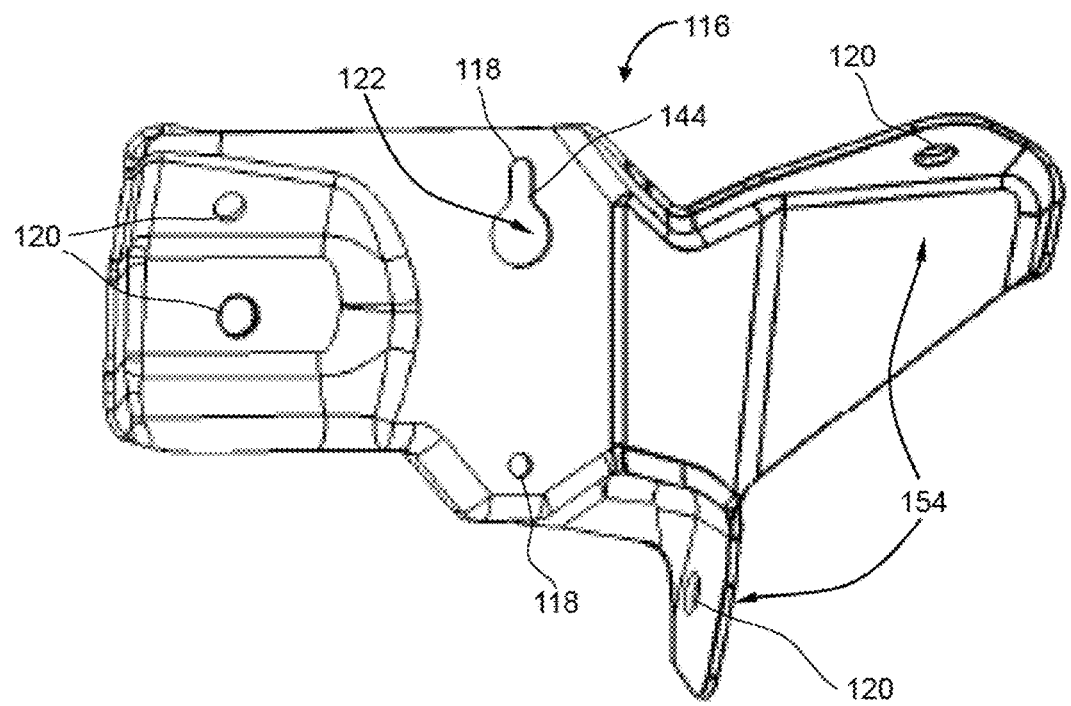
FIG. 8 is a perspective view of the bracket member used for mounting a rear right wheel well accent light assembly of the accent lighting assembly.

FIG. 6 and FIG. 8 illustrate a perspective view of the bracket member 116 used for securing another accent light 104 and bracket member of the accent lighting assembly 102 to the utility vehicle 100. The bracket member 116 shown in FIG. 6 and FIG. 8 includes accent light mounting holes 118 and bracket mounting holes 120. The accent light mounting holes 118 may include opening 122 with a slotted portion 144. The opening 122 should be large enough to allow wire harness 124 (see FIG. 12) for an accent lighting system 102 to pass through. Specifically, the opening 122 is large enough for the coupler 152 of the wire harness 124 to pass through (see FIG. 12).

In addition, the bracket member 116 may include the formed portion 154 around the bracket mounting holes 120. The formed portion 154 may be indented or embossed, as shown in FIG. 6. Also, the formed portion 154 may be bent or angled, as shown in FIG. 8. The formed portion 154 allows the bracket member 116 to align with the contours of the utility vehicle 100 when attaching with fasteners 134. Finally, the formed portion 154 may include ribs (not shown) to provide added structure or reinforcement for the bracket mounting holes 120 and the bracket member 116.

Figure 7:
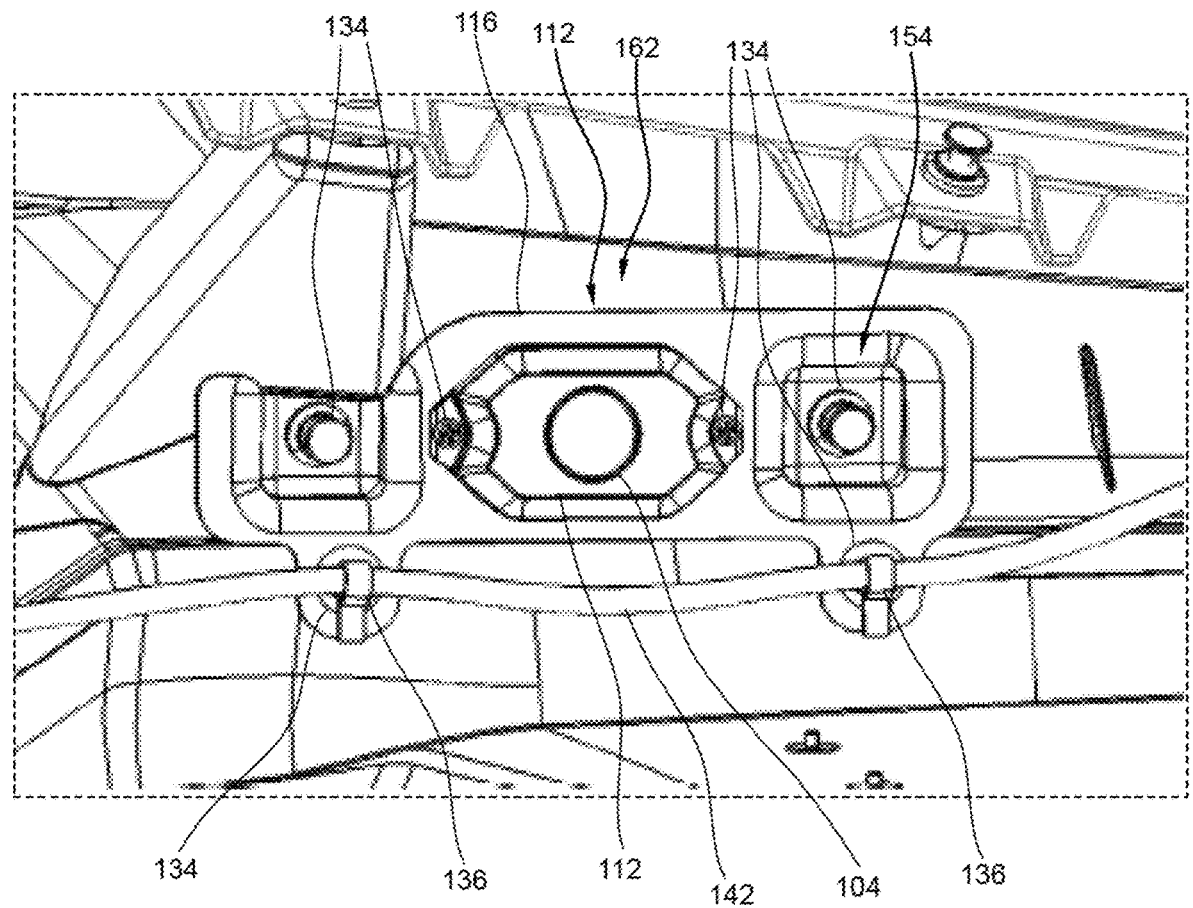
FIG. 7 is a perspective of the bracket member of FIG. 6. with the rear left wheel well accent light assembly installed and mounted to the utility vehicle.

FIG. 7 is a perspective view of the bracket member 116 of FIG. 6. with a rear left wheel well accent light assembly 112 installed and mounted to the wheel well 162 the utility vehicle 100. The rear left wheel well accent light assembly 112 includes an accent light 104 attached to the bracket member 116 with fasteners 134. The fasteners 134 may include a wrap portion 136 for securing wiring 142 of the utility vehicle 100. The wiring 142 may be used for electrical components of the utility vehicle 100, such as headlight or taillight assemblies (not shown). The wrap portion 136 may be an adjustable strap-like band, such as a cinch strap, hook and loop strap, cam-buckle strap, buckle strap, zip-tie or other strap-like bands known to those with ordinary skill in the art.

FIG. 7 shows the formed portion 154 to be an indented or embossed surface on a different plane than the accent light 104. As shown in FIG. 6, the formed portion 154 around the bracket mounting holes 120 allows the bracket member 116 to be installed to the wheel well 162 with better alignment and less gap. The formed portion 154 may include ribs (not shown) to provide added structure or reinforcement for the bracket mounting holes 120 and the bracket member 116. Fasteners 134 may be a push-pin type, as shown in FIG. 7; however, it will be appreciated that other fasteners common in the art may be used, such as screws or bolts. The fasteners 134 used to attach the accent light 104 to the bracket member 116 may also extend to the utility vehicle 100 to also secure the bracket member 116 to the utility vehicle 100.

Figure 9:
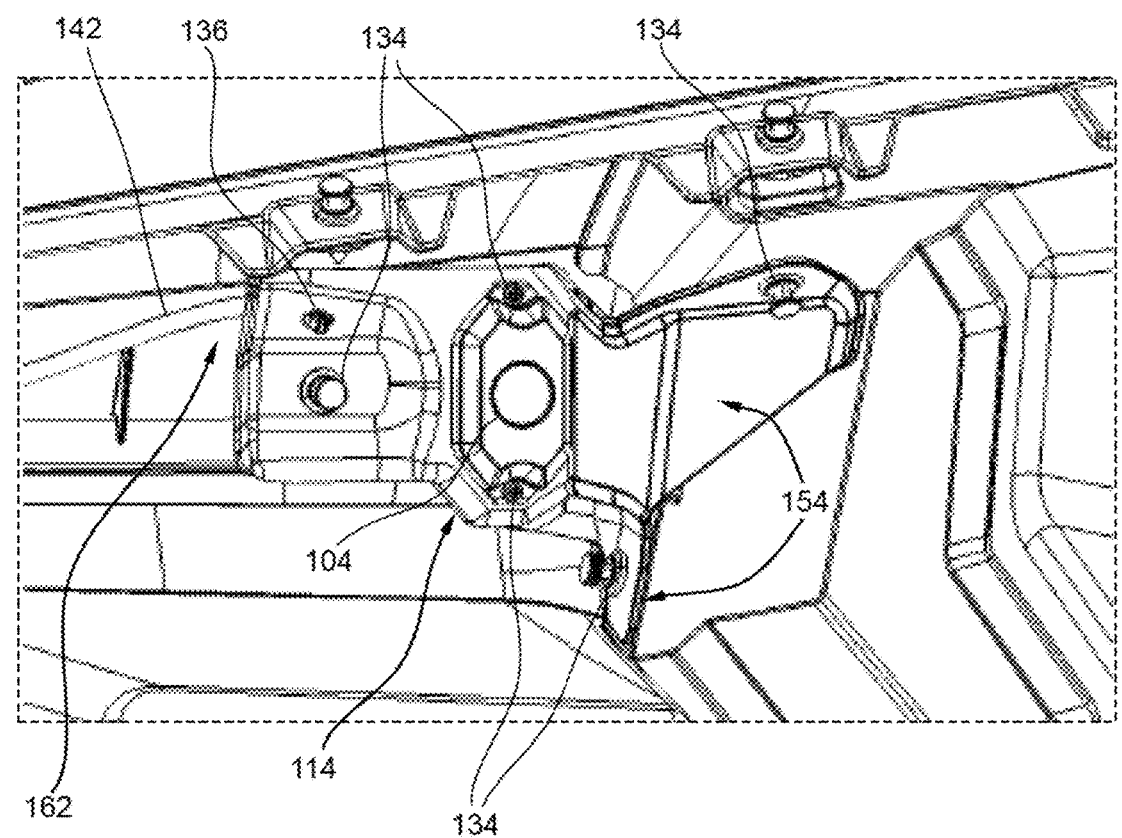
FIG. 9 is a perspective of the bracket member of FIG. 8. with the rear right wheel well accent light assembly installed and mounted to the utility vehicle.

FIG. 9 is a perspective of the bracket member 116 of FIG. 8. with the rear right wheel well accent light assembly 114 installed and mounted to the utility vehicle 100. The rear right-wheel well accent light assembly 114 includes accent light 104 attached to the bracket member 116 with fasteners 134. Fasteners 134 may be screws or push-pin type, as shown in FIG. 9; however, it will be appreciated that other fasteners common in the art may be used, such as bolts. The fasteners 134 may include wrap portion 136, as shown in FIG. 7 to secure the wiring 142 of the utility vehicle 100. The wrap portion 136 of FIG. 9 secures the vehicle wiring 142 above the bracket member 116 and is not visible in FIG. 9. In FIG. 9, the wrap portion 136 (not visible) is between the bracket member 116 and the fender well 162 of the utility vehicle 100. The wiring 142 may be used for electrical components of the utility vehicle 100, such as headlight or taillight assemblies (not shown). The wrap portion 136 may be an adjustable strap-like band, such as a cinch strap, hook and loop strap, cam-buckle strap, buckle strap, zip-tie or other strap-like bands known to those with ordinary skill in the art.

In addition, FIG. 9 shows the formed portion 154 to be an angled or bent surface on a different plane than the accent light 104. The formed portion 154 around the bracket mounting holes 120, see FIG. 8, allows the bracket member 116 to be installed to the wheel well 162 with better alignment and less gap between the bracket member 116 and the wheel well 162. The formed portion 154 may include ribs (not shown) to provide added structure or reinforcement for the bracket mounting holes 120 and the bracket member 116.

Figure 10:
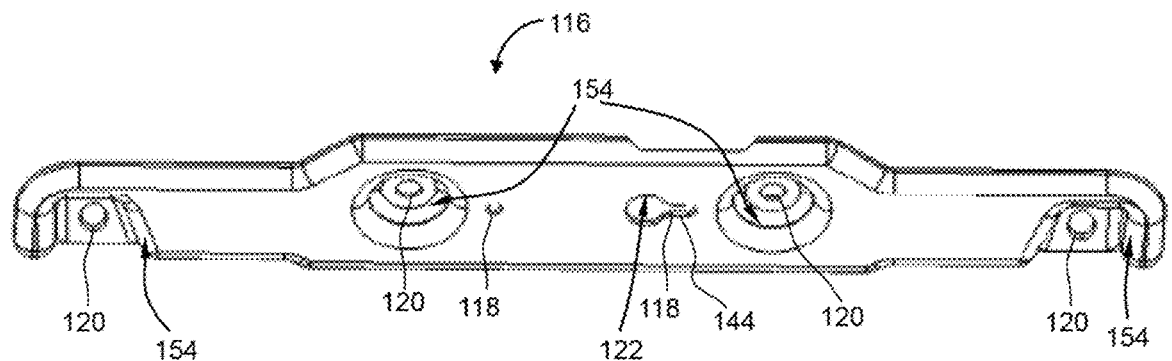
FIG. 10 is a perspective view of the bracket member used for mounting a forward mounted accent light assembly of the accent lighting assembly.

FIG. 10 is a perspective view of the bracket member 116 used for mounting the forward mounted accent light assembly 106 of the accent lighting assembly 102 to the utility vehicle 100. The bracket member 116 shown in FIG. 10 includes accent light mounting holes 118 and bracket mounting holes 120. The accent light mounting holes 118 may include opening 122 with a slotted portion 144. The opening 122 should be large enough to allow wire harness 124 (see FIG. 12) for the accent lighting system 102 to pass through. Specifically, the opening 122 is large enough for the coupler 152 of the wire harness 124 to pass through (see FIG. 12).

In addition, the bracket member 116 may include a formed portion 154 around the bracket mounting holes 120. The formed portion 154 may be indented or embossed, as shown in FIG. 10. The formed portion 154 allows the bracket member 116 to align with the utility vehicle 100 when attaching with fasteners 134. Finally, the formed portion 154 may include ribs (not shown) to provide added structure or reinforcement for the bracket mounting holes 120 and the bracket member 116.

Figure 11:
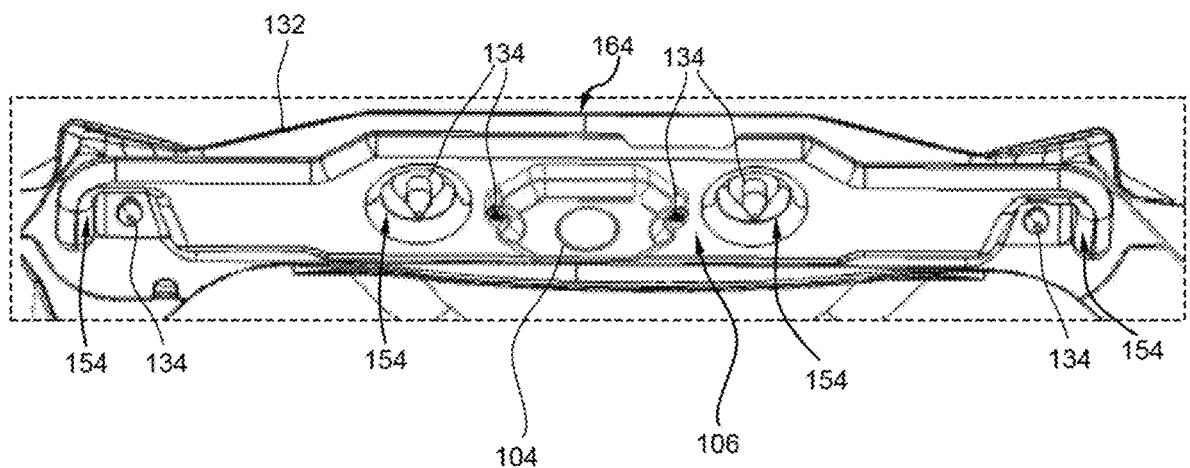
FIG. 11 is a perspective view of the bracket member of FIG. 10. with the forward mounted accent light assembly installed and mounted to the utility vehicle.

FIG. 11 is a perspective of the bracket member 116 of FIG. 10. with the forward mounted accent light assembly 106 installed and mounted to a front center portion 164 of the utility vehicle 100. The front center portion 164 may include a radiator 130, as shown in FIGS. 1 and 2. The forward mounted accent light assembly 106 includes accent light 104 attached to the bracket member 116 with fasteners 134. The fasteners 134 may be screws, as shown in FIG. 11; however, it will be appreciated that other fasteners common in the art may be used, such as push-pins or bolts. The fasteners 134 used to attach the accent light 104 may also extend to a radiator shroud 132 of the radiator 130 to secure the bracket member 116 to the utility vehicle 100.

Figure 12:
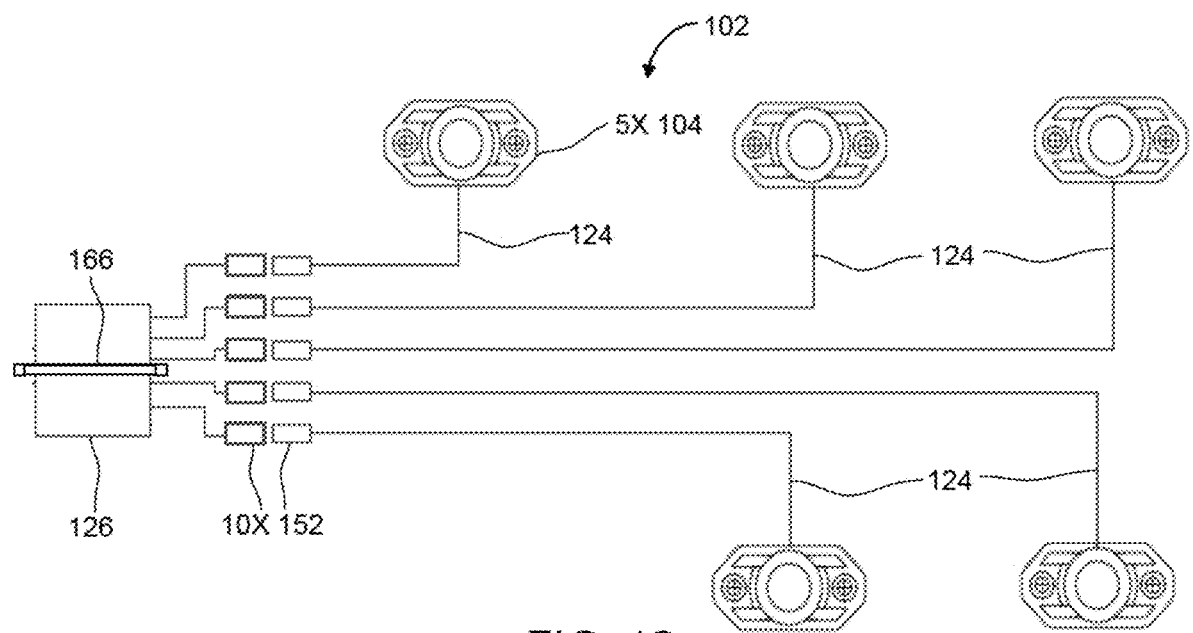
FIG. 12 is a schematic view of the accent lighting assembly.

FIG. 12 is a schematic view of the accent lighting assembly 102. The accent lighting assembly 102 shown in FIG. 12 includes five accent lights 104. The accent lights 104 may include wire harness 124 having a coupler 152. The wire harness 124 for accent lights 104 may vary in length, as shown in FIG. 12. The length of the wire harness 124 may vary depending on the mounting location of the accent light 104 on the utility vehicle 100. The coupler 152 is used to connect the wire harness 124 to a controller 126 of the accent lighting assembly 102. The controller 126 may include couplers 152 on its surface, or extending from the controller 126, as shown in FIG. 12. The couplers 152 may be male from the accent lights 104 and female from the controller 126. However, it will be appreciated that the use of male or female couplers 152 can be interchangeable between the controller 126 and the accent lights 104.

The wire harnesses 124 couples the accent lights 104 to the controller 126. The controller 126 is coupled to a power source (not shown) within the utility vehicle 100. The power source provides electrical power for the controller 126 to function and illuminate the accent lights 104. The wire harness 124 of the accent lighting assembly 102 is designed to reduce or eliminate body modifications or holes needed to install the accent lighting assembly 102.

The controller 126 may include a strap 166, as shown in FIG. 12. The strap 166 may be used to secure the controller 126 to the utility vehicle 100 and prevent movement of the controller 126. Additionally, a mount (not shown) matching the contours of the controller 126 may be attached to the utility vehicle 100 to further secure the controller 126. The mount may also include attachment points for the strap 166, such as a hook or other shape capable of receiving the strap 166. However, other means such as fasteners may be used to secure the controller 126. It is envisioned that the controller 126 is mounted under the hood 168 to reduce exposure to moisture, dirt, and debris. Specifically, the controller 126 may be secured to a support bracket 172 with the strap 166. However, the controller 126 may be mounted in other locations on the utility vehicle 100.

Figure 13:
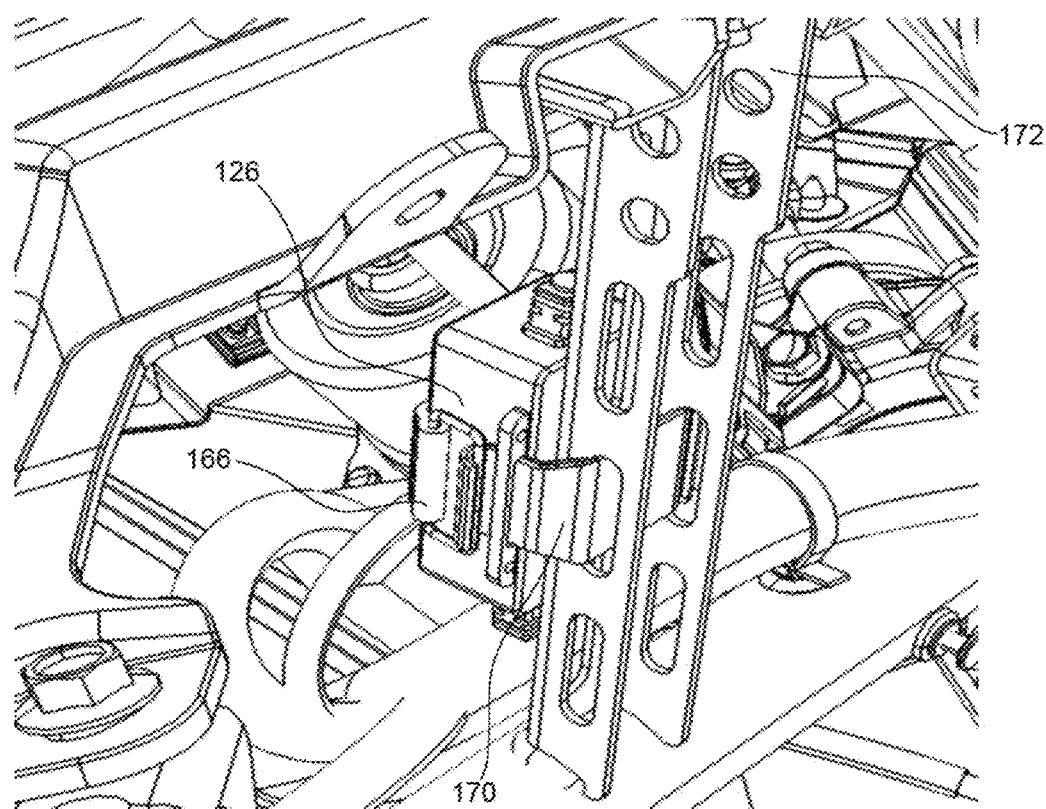
FIG. 13 is a perspective view of the controller of FIG. 12. mounted to the utility vehicle.
Figure 14:
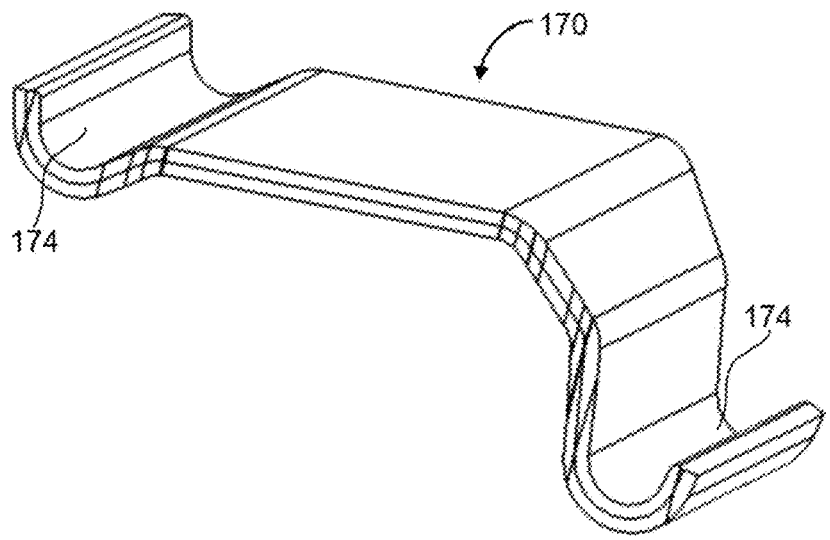
FIG. 14 is a perspective view of the controller mount of FIG. 13. mounted to the utility vehicle.
Figure 15:
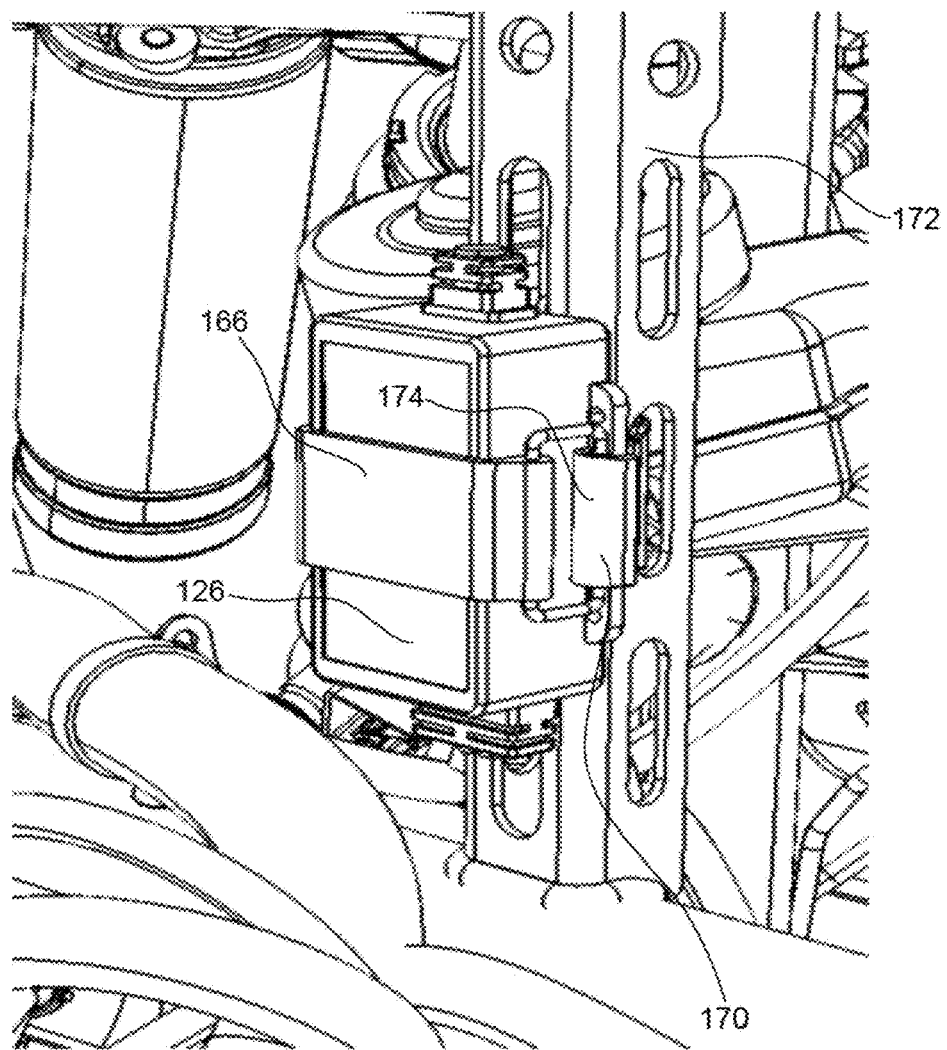
FIG. 15 is another perspective view of the controller of FIG. 12. mounted to the utility vehicle.

FIG. 13 and FIG. 15 are perspective views of the controller 126 of FIG. 12. mounted to the utility vehicle 100. The controller 126 is mounted to a controller mount 170 with the strap 166. The controller mount 170 includes a curved portion 174, as best shown in FIG. 14, for receiving the strap 166. The controller mount 170 is routed through openings in the support bracket 172. The support bracket 172 may be u-shaped as shown in FIG. 13 for easier access and less weight. The strap 166 wraps around the controller 126 and attaches to the curved portion 174 of the controller mount 170. The strap 166 is made of rubber or some other elastic material for securing the controller 126 to the controller mount 170 that is routed through openings in the support bracket 172.

FIG. 14 is a perspective view of the controller mount 170 of FIG. 13. The controller mount 170 includes a profile which allows it to be routed through openings in the support bracket 172. After the controller mount 170 is routed through the openings in the support bracket 172, the curved portion 174 is facing away from the controller 126 for receiving the strap 166 which applies against the controller 126 and allows it to be securely installed to the support bracket 172.

The controller 126 may receive input from a remote device 150 (not shown). The remote device 150 is envisioned to be a wireless remote control with button for receiving input; however, it may also be a wired remote mounted inside the cabin 128 of the utility vehicle 100. The remote device 150 may comprise a plurality of buttons, wherein each button is configured to perform a different function, such as turning the accent lights 104 on or off, changing the color of the light, changing the pattern, or changing the brightness. Additionally, the remote device 150 may include a timer function, wherein the timer is configured to turn the light source on and off at predetermined intervals. Alternatively, the remote device 150 may be a smartphone (not shown) in communication with the controller 126. The smartphone includes an application with touchable icons instead of physical buttons for performing different functions of the vehicle lighting assembly 102.

The controller 126 may receive input from sensors (not shown) for detecting ambient lighting and signaling to the controller 126 to automatically turn on the accent lighting assembly 102 if the ambient lighting is below a certain level. Sensors may also be used to detect the presence of a rock or other object in the target area, wherein the accent lighting assembly 102 is automatically turned on when the sensor detects the presence of a rock or other object.

The accent lights 104 may be configured to emit a variety of patterns, including solid colors, flashing colors, and alternating colors, including white, red, blue, green, and yellow. In addition, the accent lights 104 may be configured to emit a variety of brightness levels, including low, medium, and high. The light source of the accent lights 104 may be a light-emitting diode (LED), halogen bulbs, or xenon bulbs. Finally, the accent lights 104 may include a variety of shapes and configurations, such as angled surfaces (not shown) with multiple bulbs, light-emitting-diodes or other lighting sources in various locations, or surfaces of the accent light 104. For example, the accent light 104 may include two or more angled surfaces with lighting on each angled surface to provide illumination for the underside 148 of the utility vehicle 100.

The embodiments described herein relate to systems and methods of mounting an accent lighting system to a utility vehicle in a manner that facilitates reducing the complexity of the installation process while also preserving the aesthetics and structural integrity of the utility vehicle. The systems and methods described herein accomplish the aforementioned objectives by utilizing bracket members to secure the accent lighting system to the utility vehicle. As such, the accent lighting system is mountable on the utility vehicle in a secure, non-destructive and user-friendly manner.

Exemplary embodiments of an accent lighting mounting system and related methods of use are described above in detail. It should also be noted that the components of the invention are not limited to the specific embodiments described herein, but rather, aspects of each component may be utilized independently and separately from other components and methods of assembly described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An accent lighting assembly for a utility vehicle having a side-by-side seating arrangement, comprising:
    a forward mounted accent light assembly;
    a front left wheel well accent light assembly and front right wheel well accent light assembly;
    a rear left wheel well accent light assembly and rear right wheel well accent light assembly;
    a bracket member coupled to each accent light including accent light mounting holes and bracket mounting holes for attachment to the utility vehicle,
    the bracket member includes an opening for routing a wire harness; and
    the accent lighting assembly includes a controller mounted to a support bracket of the utility vehicle, wherein the controller is in communication with the accent lights.

2. The accent lighting assembly according to claim 1, wherein the forward mounted accent light assembly is mounted to a radiator.

3. The accent lighting assembly according to claim 1, wherein the bracket mounting holes are secured to the utility vehicle with removeable type fasteners.

4. The accent lighting assembly according to claim 3, wherein the fasteners include wrap portion for securing wiring of the utility vehicle.

5. The accent lighting assembly according to claim 1, wherein the front left wheel well accent light assembly and the front right wheel well accent light assembly include a formed portion for contour around a frame member.

6. The accent lighting assembly according to claim 1, wherein the opening for routing the wire harness is part of the accent light mounting hole.

7. The accent lighting assembly according to claim 1, wherein the opening includes a slotted portion.

8. The accent lighting assembly according to claim 1, wherein the controller is secured to the support bracket under a hood of the utility vehicle.

9. The accent lighting assembly according to claim 1, wherein the controller receives input from a remote device.

10. The accent lighting assembly according to claim 1, wherein the bracket member includes the formed portion around the bracket mounting holes.

11. A utility vehicle comprising:
    an engine at least partially encompassing an area rearward of a vehicle seat;
    a cargo bed extending rearward of the vehicle seat;
    a radiator at least partially encompassing an area forward of the vehicle seat;
    an accent light assembly mounted in at least four positions on an underside of the utility vehicle;
    a bracket member coupled to each accent light assembly with fasteners;

the bracket members include bracket mounting holes for attachment to the utility vehicle; and the bracket members are removable from the utility vehicle with at least one fastener, wherein the bracket members include formed portions aligning with contours of the utility vehicle.

12. The utility vehicle according to claim 11, wherein the bracket member includes an accent light mounting hole with an opening for routing a wire harness.

13. The utility vehicle according to claim 12, wherein the opening includes a slotted portion for coupling the accent light to the bracket member.

14. The utility vehicle according to claim 11, wherein accent lights are mounted in each wheel well of the utility vehicle.

15. The utility vehicle according to claim 11, wherein at least one bracket member includes the formed portion for contour around a frame member.

16. The utility vehicle according to claim 11, wherein a front center portion of the utility vehicle includes an accent light.

17. A method of mounting an accent lighting system to a utility vehicle including a side-by-side seating arrangement and a cargo bed extending rearward of the vehicle seat, the method comprising:

mounting at least four bracket members to the underside of the utility vehicle, each bracket member includes bracket mounting holes for attachment to the utility vehicle and accent light mounting holes;

mounting at least one bracket member of the at least four bracket members to a radiator shroud;

mounting a controller to the utility vehicle;

routing a wire harness of an accent light through an opening in each bracket; and attaching the accent lights to the accent light mounting holes of each bracket.

18. The method in accordance with claim 17, wherein the opening includes a slotted portion for mounting the accent lights to the bracket members.

19. The method in accordance with claim 17, wherein mounting the at least four accent light brackets comprises at least one accent light bracket with a formed portion aligning with contours of the utility vehicle.

\* \* \* \* \*